Dec. 15, 1931.  O. F. GOTTLIEB  1,836,465
TIRE CARRIER
Filed Nov. 29, 1929
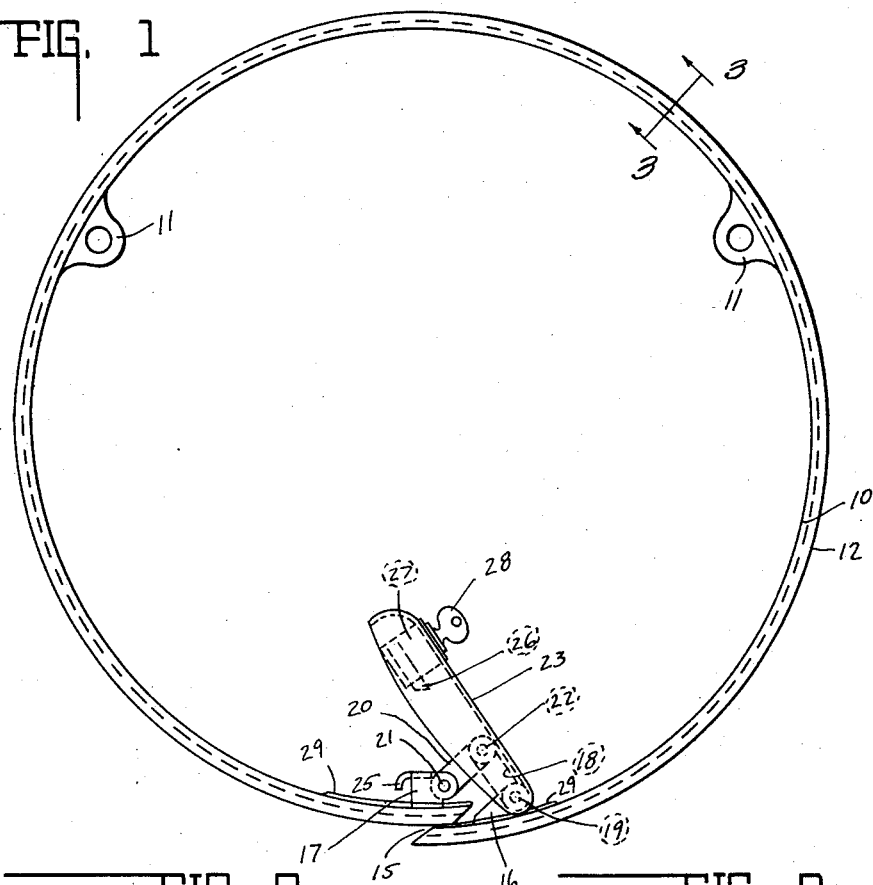
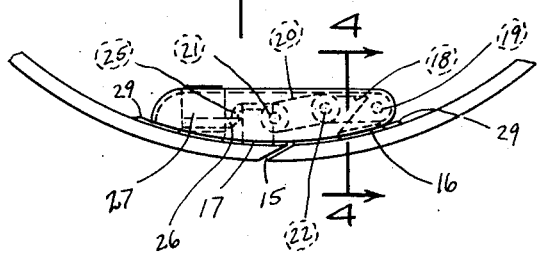
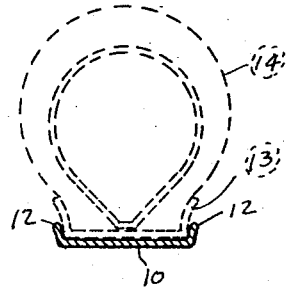
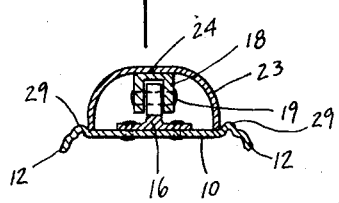
INVENTOR.
OSCAR F. GOTTLIEB.
BY Lockwood Lockwood Goldsmith & Galt
ATTORNEYS.

Patented Dec. 15, 1931

1,836,465

UNITED STATES PATENT OFFICE

OSCAR F. GOTTLIEB, OF INDIANAPOLIS, INDIANA

TIRE CARRIER

Application filed November 29, 1929. Serial No. 410,307.

This invention relates to a tire carrier principally for use in carrying the spare tire for motor vehicles.

The pricipal object of the invention is to provide a carrier which may be locked in place for preventing theft and which offers great protection against removal of the tire by forcible breakage of the locking mechanism.

The principal feature of the invention resides in the provision of a substantially circular flanged carrier adapted to engage the rim of a vehicle tire. The said carrier is split at its lower side and linkages are provided for drawing the ends of the carrier adjacent the split into an overlapping position for removal of the tire and for returning the same to abutting position for retaining the tire. The linkage is operated by means of a lever which is shaped to form a cover for the entire linkage mechanism when in locking position. A lock is provided for maintaining the said lever in locking position and the said lock is likewise covered by said lever.

All of the pivotal connections for the linkage are enclosed within the lever and, therefore, the pivot pins can not be driven out without removal of the cover. The cover itself is rounded to increase the difficulty of applying a wrench or other tool thereto for forcible removal of the cover.

Other objects and features of the invention will be further understood from the accompanying drawings and the following description and claims:

Fig. 1 is an elevational view of the tire carrier and linkage in position for removal or application of a tire. Fig. 2 is an enlarged view illustrating the linkage in locking position. Fig. 3 is a sectional view taken on the line 3—3 of Fig. 1 with a tire and rim in position. Fig. 4 is a sectional view taken on the line 4—4 of Fig. 2.

A substantially circular retaining member 10 is provided and may be supported upon the vehicle by means of lugs 11 or any other suitable attachment. The retaining member 10 is preferably formed with flanges 12 adapted to engage and retain the rim 13 of a vehicle tire 14. Herein the flanges 12 are shown formed about the entire periphery of the retaining member 10. If desired, however, the said flanges may be formed on selected portions of the retaining members 10 without continuing the full distance about the said member. The retaining member is split at 15 in the lower portion. A hinge member 16 is mounted on the inner side of the retaining member 10 adjacent one side of the split and a hinge member 17 is similarly mounted adjacent the other side of the split. A link 18 is pivotally connected to the hinge member 16 by means of a pin 19 and a link 20 is similarly connected to the hinge member 17 by means of a pin 21. The links 18 and 20 are pivotally connected together by means of a pin 22. The link 18 is formed in an inverted U-shape as illustrated in Fig. 4. A combined lever and cover member 23 is fastened to the said link at 24 by spot welding or other suitable fastening means which can not be easily broken from the outside. By means of this lever and linkage, the ends of the retaining member 10 may be drawn past each other as illustrated in Fig. 1 for collapsing the said member for removal or replacement of a tire. By moving the said lever to the position shown in Fig. 2, the retaining member 10 is expanded into retaining position.

The hinge member 17 carries a projecting portion 25 adapted to engage the latch 26 of a lock 27 carried within the lever and cover member 23. The said lock may be of any well known form and is positioned so that a key 28 may be inserted therein as illustrated in Fig. 1. Thus the latch member 26 and its cooperating member 25 are completely covered by the member 23 when in locking position and no damage can be done to them without removal of the said cover member.

As illustrated in Fig. 4, the cover member 23 is formed with a relatively broad curvature, thus making it difficult to apply a wrench or other tool thereto for forcibly removing the said member. A bead 29 is formed in the member 10 completely surrounding the cover member 23 when in locking position. The said cover member fits closely within the bead and thereby renders it difficult or impossible to insert a prying tool therebeneath.

The invention claimed is:

1. A tire carrier including a split retaining member adapted to support and retain the rim of a vehicle tire, a lever pivotally mounted upon said member at one side of the split, a link pivotally connected to said member at the opposite side of said split and connected to said lever, whereby movement of said lever moves said retaining member into and out of retaining position, said lever being formed to cover said link and the pivotal connections thereof when in retaining position, and a lock for maintaining said lever in retaining position.

2. A tire carrier including a split retaining member adapted to support and retain the rim of a vehicle tire, a lever pivotally mounted upon said member at one side of the split, a link pivotally connected to said member at the opposite side of said split and connected to said lever, whereby movement of said lever moves said retaining member into and out of retaining position, said lever being formed to cover said link and the pivotal connections of said link and said lever when in retaining position, and a lock for maintaining said lever in retaining position.

3. A tire carrier including a split retaining member adapted to support and retain the rim of a vehicle tire, a lever pivotally mounted upon said member at one side of the split, a link pivotally connected to said member at the opposite side of said split and connected to said lever, whereby movement of said lever moves said retaining member into and out of retaining position, and a lock for maintaining said lever in retaining position, said lever being formed to cover said link, the pivotal connections of said link and lever and said lock when in retaining position.

4. A tire carrier including a split retaining member adapted to support and retain the rim of a vehicle tire, a link pivotally mounted upon said member at each side of the split, said links being pivotally connected together, a lever member fixedly attached to one of said links and adapted to move said links to bring said retaining member into retaining and non-retaining positions, said lever being formed to cover said links when in retaining position, and a lock for maintaining said lever in said position.

5. A tire carrier including a split retaining member adapted to support and retain the rim of a vehicle tire, a link pivotally mounted upon said member at each side of the split, said links being pivotally connected together, a lever member fixedly attached to one of said links and adapted to move said links to bring said retaining member into retaining and non-retaining positions, and a lock for maintaining said lever in retaining position, said lever being shaped to cover said links and said lock when in said position.

6. A tire carrier including a split retaining member adapted to support and retain the rim of a vehicle tire, a link pivotally mounted upon said member at each side of the split, said links being pivotally connected together, a lever member fixedly attached to one of said links and adapted to move said links to bring said retaining member into retaining and non-retaining positions, said lever being formed to cover said links when in retaining position and being rounded to prevent application of a tool thereto, and a lock for maintaining said lever in said position.

7. A tire carrier including a retaining member adapted to support and retain the rim of a vehicle tire, a linkage for moving said member into retaining and non-retaining positions, a cover member adapted to enclose said linkage when said retaining member is in retaining position, a lock for maintaining said cover member in linkage-covering position, and a bead formed on said retaining member and surrounding said cover member for preventing insertion of a tool therebetween.

8. A tire carrier including a split retaining member adapted to support and retain the rim of a vehicle tire, a link pivotally mounted upon said member at each side of the split, said links being pivotally connected together, a lever member fixedly attached to one of said links and adapted to move said links to bring said retaining member into retaining and non-retaining positions, said lever being formed to cover said links when in retaining position, a bead formed on said retaining member and surrounding said cover member for preventing insertion of a tool therebetween, and a lock for maintaining said lever in said position.

In witness whereof, I have hereunto affixed my signature.

OSCAR F. GOTTLIEB.